UNITED STATES PATENT OFFICE.

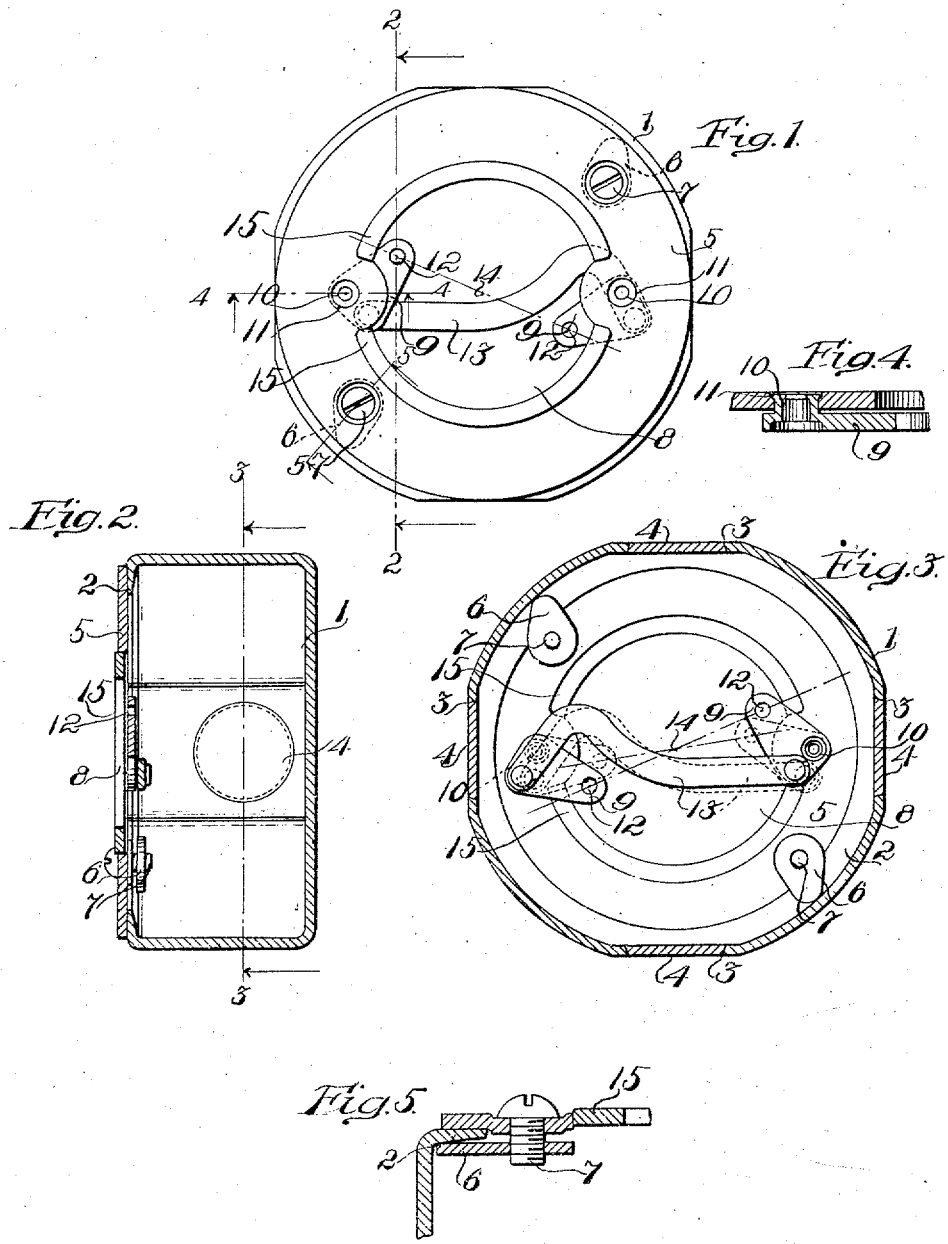

NORMAN MARSHALL, OF NEWTON, MASSACHUSETTS, ASSIGNOR, BY MESNE ASSIGNMENTS, TO ARROW ELECTRIC COMPANY, OF HARTFORD, CONNECTICUT, A CORPORATION OF CONNECTICUT.

OUTLET-BOX.

955,820.  Specification of Letters Patent.   Patented Apr. 19, 1910.

Application filed October 31, 1908. Serial No. 460,494.

*To all whom it may concern:*

Be it known that I, NORMAN MARSHALL, a citizen of the United States, residing at Newton, in the county of Middlesex and State of Massachusetts, have invented certain new and useful Improvements in Outlet-Boxes; and I do hereby declare the following to be a full, clear, and exact description of the invention, such as will enable others skilled in the art to which it appertains to make and use the same.

The invention relates to outlet boxes such as are used in connection with interior conduit systems for electric wiring, and more especially to outlet boxes which are adapted for supporting switches, rosettes and analogous electric fittings.

Electric fittings of the class referred to are usually provided with bases of varying diameters, and are secured in position by securing screws arranged on diametrically opposite sides of the base, the spacing of these securing screws varying in different sizes and types of fittings.

It is one object of the present invention to provide an outlet box to which fittings of various types and sizes may be readily and conveniently secured.

A further object is to provide for locating the fitting or device connected with the outlet box in any desired position with relation to the outlet box or the pipe end or conductor to which it is secured.

To these ends one feature of the invention consists in providing an outlet box with connecting devices for electric fitting which may be adjusted in accordance with the location of the securing devices of the fitting which is to be connected with the outlet box. In accordance with this feature of the invention, broadly considered, the connecting devices may be of any suitable construction and arrangement, and the provision for adjusting them to correspond to differently located securing devices on the electric fittings may be made in any suitable manner.

In accordance with a further feature of the invention, the devices to which the securing devices of the fittings are connected are so constructed and arranged that they are self centering, that is to say, they are maintained at all times in proper relation to center the connected fixture upon the outlet box. This self centering action is preferably secured by so connecting the plates that the adjustment of one is accompanied by a corresponding adjustment of the other, while the points of connection with the fitting are maintained at equal distances from and on diametrically opposite sides of a common center.

The connecting devices which I prefer to employ in embodying these features of the invention in a simple and efficient construction consist of plates which are pivoted to the top or cover of the outlet box, and are provided with screw threaded holes for receiving the securing screws of a fitting. The means for connecting the plates so that they are simultaneously adjusted and are rendered self centering which I prefer to employ consists of a link connecting the plates and acting to maintain the screw threaded holes therein on diametrically opposite sides of the center of the outlet box, and at equal distances therefrom, whatever the adjustment of the plates.

Further features of the invention relate to the means for securing the cover of an outlet box to the top or open side so that it may be readily secured in any desired position upon the box, and still further features relate to the means for varying the size of the opening through the cover of an outlet box to suit different diameters of fittings which it may be desired to secure upon the cover.

The various features of the invention will be readily understood from an inspection of the accompanying drawings, in which an outlet box is shown embodying the invention in its preferred form.

In the drawings Figure 1 is a plan view of an outlet box embodying one form of the invention; Fig. 2 is a sectional view on line 2—2, Fig. 1; Fig. 3 is a sectional view on line 3—3, Fig. 2, looking toward the left; Fig. 4 is a detail sectional view on line 4—4, Fig. 1; and Fig. 5 is a detail sectional view on line 5—5, Fig. 1.

The outlet box shown in the drawings consists of a casing 1 drawn up from sheet metal, and is provided with several apertures 3 through which the electric conductors may enter the box, and in which the devices for securing the box to the ends of pipes may be located. These apertures are closed by removable plugs 4, any of which may be removed to provide an aperture at the desired point on the box.

The walls of the box are turned inward at its top or open side to form an inwardly extending flange 2, the inner edge of which is circular, so that a circular opening is formed in the top of the box. This opening is closed or partially closed by a cover which is secured in position by clamping plates arranged to underlie the flange 2 and hold the cover securely in position. These devices for adjustably securing the cover to an outlet box form a feature of the invention, and may be employed in securing different types of covers in place upon the box.

The cover shown in the drawings is constructed to support any of the various sizes of switches, rosettes and similar fittings which are commonly manufactured and put upon the market, and embodies various features of the invention in their preferred forms. This cover consists of a plate 5 which is provided with two eccentric clamping plates 6. These plates are connected with the cover plate by screws 7, and are so shaped that they may be turned in position to pass through the opening within the flange in applying the cover to the box, and may thereafter be swung under and drawn firmly against the flange by turning the screws 7. In practice I prefer to fit the screws tightly in the threaded holes in the clamping plates, so that the plates will turn with the screws, and less resistance is offered to the turning of the plates. I also prefer to so construct the plates that when they are swung under the flange they will project sufficiently from the screws 7 to strike against the walls of the box, so that the turning of the plates will be arrested. In applying the cover to the box, the clamping plates are turned into position so that they will pass through the opening within the flange, and the cover is turned until it is brought into the desired position with relation to the box or to the pipes with which the box is connected. The screws 7 are then turned, swinging the plates 6 under the flange until the plates strike the walls of the box, when further turning of the screws draws the plates firmly against the flange, thus clamping the cover in adjusted position. By thus adjustably mounting the cover upon the box, the cover may be secured in position to bring the switch, rosette or other fitting connected with or suspended from the cover into proper position, whatever the position of the box with relation to the pipe with which it is connected.

The cover shown is provided with devices for receiving the securing screws of a switch, rosette or other fitting, and is provided with a substantially circular central opening 8 through which the conductors may lead to the fitting, and through which the securing screws may pass in attaching the fitting to the devices which receive the screws. The connecting devices for receiving the securing screws of the fittings comprise two connecting plates 9 which are pivotally mounted upon the under side of the cover 5, preferably in the manner shown in Fig. 4. As here shown, the pivot 10 of the connecting plate is formed by punching out a portion of the metal of the plate, and the plate is retained in the cover by spreading the upper end of the pivot so that it lies within an annular enlargement at the upper end of the hole 11 within which the pivot 10 turns. The free end of each connecting plate is provided with a screw threaded hole 12 adapted to receive the securing screw of an electric fitting. The plates are so arranged that the holes 12 lie within the opening 8 so that the securing screws may be readily introduced therein. The plates 9 are connected by a link 13, so that the plates when adjusted will be moved uniformly in opposite directions, and in such manner that the line connecting the centers of the holes 12 will pass through a common center 14 whatever the adjustment of the plates, and the holes will also be at equal distances from the center. The plates are thus self centering, and are always maintained in such relation that they will properly support and center the fitting secured thereto, whatever the spacing of the securing screws of the fixture.

The opening 8 through which the securing screws pass into the connecting plates 9 should be of such size that it will be completely covered by the base of the switch or rosette when it is secured in position upon the outlet box. The opening should also be large enough so that the connecting plates may be adjusted to bring the screw holes in the connecting plates far enough apart to accommodate the securing screws of the largest sizes of rosettes and switches. There is such a variation in the sizes between the largest and smallest sizes of rosettes and switches as manufactured that if the opening 8 is made sufficiently small to be covered by the base of the smallest switch or rosette, then the screw holes 12 will pass under the edge of the opening when they are adjusted to receive the securing screws of the largest sizes of rosettes and switches. To adapt the cover for properly supporting all sizes of switches and rosettes, the cover is provided with two segmental knock-out plates 15. These knock-out plates are firmly held within the cover, and when in position, form an opening 8 which is of such a size that it will be covered by the base of the smallest size switch or rosette. If the cover is to be used for the largest sizes of switches or rosettes, the knock-out plates 15 are removed, and the opening 8 is thus enlarged so that the securing screws may pass through the opening into the holes 12 in the connecting plates when the holes are properly spaced to register with the screw holes in the rosette or switch.

While I prefer to employ the construction and arrangement of device shown and described, it will be understood that the invention is not confined to this construction, and that the construction and arrangement of the parts may be varied and modified without departing from the invention.

Having explained the nature and object of the invention, and specifically described one construction in which it may be embodied, what I claim is:—

1. An outlet box provided with movable devices for connecting electric fittings thereto, and connections between the movable devices for maintaining the devices in centering relation as they are adjusted, substantially as described.

2. An outlet box provided with movable connecting plates for receiving the securing devices of electric fittings, and means connecting said plates for simultaneous adjustment, substantially as described.

3. An outlet box provided with pivoted connecting plates, and connections between the plates for maintaining them in centering relation as they are adjusted, substantially as described.

4. An outlet box provided with pivoted connecting plates, and a link connecting the plates to move them in opposite directions, substantially as described.

5. An outlet box provided with a detachable cover, connecting plates movably mounted on the cover, and means between the plates for simultaneously moving them in opposite directions, substantially as described.

6. An outlet box provided with a cover having an opening through its center, connecting plates pivoted on the cover and provided with holes for receiving the screws of an electric fitting arranged to lie within the opening, and means for connecting the plates for simultaneous adjustment toward or from the center of the opening, substantially as described.

7. An outlet box provided with a cover, adjustable connecting plates mounted on the cover and provided with holes for receiving the screws of electric fittings, said cover having an opening through which the connecting screws pass into the plates, and knock-out plates for varying the size of the opening through the cover, substantially as described.

8. An outlet box provided with a cover having a substantially circular opening, devices for connecting electric fittings over the opening, and knock-out plates for varying the size of the opening to suit different sizes of fittings, substantially as described.

In testimony whereof I affix my signature, in presence of two witnesses.

NORMAN MARSHALL.

Witnesses:
ANNIE C. RICHARDSON.
N. D. McPHAIL.